(12) United States Patent
Koshimaki

(10) Patent No.: US 7,895,207 B2
(45) Date of Patent: Feb. 22, 2011

(54) SUBSTRATE PROCESSING SYSTEM AND DATA RETRIEVAL METHOD

(75) Inventor: Toshiro Koshimaki, Toyama (JP)

(73) Assignee: Hitachi Kokusai Electric Inc., Chiyoda-ku, Tokyo (JP)

( * ) Notice: Subject to any disclaimer, the term of this patent is extended or adjusted under 35 U.S.C. 154(b) by 377 days.

(21) Appl. No.: 12/078,188

(22) Filed: Mar. 27, 2008

(65) Prior Publication Data

US 2008/0256456 A1 Oct. 16, 2008

(30) Foreign Application Priority Data

Apr. 9, 2007 (JP) ............................. 2007-101641
Feb. 15, 2008 (JP) ............................. 2008-033987

(51) Int. Cl.
*G06F 17/30* (2006.01)
(52) U.S. Cl. ....................... 707/737; 707/641
(58) Field of Classification Search ................. 707/616, 707/640–643, 687, 713, 714, 737, 759, 765–771
See application file for complete search history.

(56) References Cited

U.S. PATENT DOCUMENTS

2002/0132380 A1* 9/2002 Nakano et al. ................ 438/14
2002/0177138 A1* 11/2002 Boissy ........................... 435/6
2003/0187848 A1* 10/2003 Ghukasyan et al. ............ 707/9
2006/0143244 A1* 6/2006 Chia .......................... 707/204

FOREIGN PATENT DOCUMENTS

JP 2006-073845 3/2006

* cited by examiner

*Primary Examiner*—Wilson Lee
(74) *Attorney, Agent, or Firm*—McGinn IP Law Group, PLLC

(57) ABSTRACT

Even when the number of apparatuses and GUI terminals increase, the load of data retrieval processing does not increase in the group administration apparatus, and hence data retrieval and display onto the GUI terminals are to be performed rapidly. Data pieces transmitted from apparatuses are classified for each group by a group administration apparatus. Thus, for example, when temperature information is to be displayed on a GUI terminal, a temperature information group is set into a retrieval condition for each display item, while a temperature setting value and a temperature monitor value are set into types. Then, these data pieces are transferred to the group administration apparatus. Then, with reference to the retrieval conditions of a plurality of display items acquired from the GUI terminal, the group administration apparatus merges display items of the same condition into one retrieval item. By virtue of this, data acquisition for the data stored in the group administration apparatus is achieved by a request on a group basis. This reduces the number of times of retrieval for the apparatus data.

18 Claims, 16 Drawing Sheets

FIG. 6

| GUI TERMINAL DISPLAY ITEM INFORMATION | | | | MERGE TABLE INFORMATION | | |
|---|---|---|---|---|---|---|
| GUI TERMINAL | DISPLAY ITEM | RETRIEVAL CONDITION | TYPE | RETRIEVAL ITEM | RETRIEVAL CONDITION | TYPE |
| 1 | 1 | 1 | 1 | 1 | 1 | 1 |
| 1 | 2 | 1 | 2 | 1 | 1 | 2 |
| 1 | 3 | 2 | 1 | 2 | 2 | 1 |
| 1 | 4 | 1 | 3 | 1 | 1 | 3 |
| 1 | n | 3 | 2 | 3 | 1 | 2 |
| 2 | 1 | 1 | 1 | 1 | 1 | 1 |
| 2 | 2 | 1 | 2 | 1 | 1 | 2 |
| 2 | 3 | 2 | 1 | 2 | 2 | 1 |
| 2 | 4 | 1 | 3 | 1 | 1 | 3 |
| 2 | n | 3 | 2 | 3 | 1 | 2 |
| n | 1 | 1 | 1 | 1 | 1 | 1 |
| n | 2 | 1 | 2 | 1 | 1 | 2 |
| n | 3 | 2 | 1 | 2 | 2 | 1 |
| n | 4 | 1 | 3 | 1 | 1 | 3 |
| n | n | 3 | 2 | 3 | 1 | 2 |

SUBSTRATE PROCESSING SYSTEM AND DATA RETRIEVAL METHOD

BACKGROUND OF THE INVENTION

1. Field of the Invention

The present invention relates to a substrate processing system in which a group administration apparatus administers, in a unified manner, information of a plurality of substrate processing apparatuses such as semiconductor manufacturing apparatuses and, in particular, to a substrate processing system and a data retrieval method for efficiently retrieving data dealt by the group administration apparatus.

2. Description of Related Art

In the related art, in a group administration apparatus, data transmitted from each semiconductor manufacturing apparatus is accumulated, on an each semiconductor manufacturing apparatus basis, in a semiconductor manufacturing apparatus data accumulation area in the inside of the group administration apparatus. Then, in response to a data acquisition request for a semiconductor manufacturing apparatus of displaying target which is periodically generated and transmitted from each GUI (Graphical User Interface) terminal (i.e., each operation terminal), the group administration apparatus searches for data of the corresponding semiconductor manufacturing apparatus in the semiconductor manufacturing apparatus data accumulation area, and then transmits the result to the corresponding GUI terminal. When a group administration apparatus having such a function is employed, for example, mismatching of a recipe and occurrence of a fault lot can be avoided in advance in substrate processing (see, for example, Japanese Laid-Open Patent Publication No. 2006-73845).

FIG. 14 is a conceptual diagram showing a flow of data in a common group administration apparatus (group administration system). That is, this diagram shows a data flow at the time of data retrieval performed in response to a display data acquisition request from a GUI terminal in a conventional group administration apparatus and, more specifically, shows a flow of acquisition of data of a semiconductor manufacturing apparatus which is to be displayed on a GUI terminal. In FIG. 14, a solid line arrow indicates a flow of data of a semiconductor manufacturing apparatus 1, while a dashed line indicates a flow of data of a semiconductor manufacturing apparatus 2, and while a dash-dotted line indicates a flow of data of a semiconductor manufacturing apparatus n. Here, in the following description, a semiconductor manufacturing apparatus having an interface according to the specification of a common equipment model (CEM [Common Equipment Model]) defined in SEMI Standard E120 is simply referred to as an apparatus in some cases.

Nevertheless, as shown in the flow of data in the group administration apparatus of the FIG. 14, when data is exchanged between n apparatuses and n GUI terminals, a load concentrated state occurs in the group administration apparatus. That is, at the time of acquisition request for the apparatus data of displaying target from a GUI terminal, when the number of items of the apparatus data to be displayed on a GUI terminal increases or alternatively when the number of apparatuses to be displayed on GUI terminals and the number of GUI terminals increase, the data retrieval processing load increases inside the group administration apparatus so as to cause a delay in data retrieval. As a result, a long time is taken for displaying data on the GUI terminals. Alternatively, in some cases, an error of time-out or the like occurs so that, as a possibility, data cannot be displayed on the GUI terminal.

SUMMARY OF THE INVENTION

The present invention has been devised in view of the above-mentioned problems. An object of the present invention is to provide a substrate processing system in which even when the number of substrate processing apparatuses such as semiconductor manufacturing apparatuses or the number of GUI terminals increases, an increase is avoided in the load of data retrieval processing inside the group administration apparatus, and hence data retrieval is performed rapidly so that required data is reliably displayed on the GUI terminals.

In order to resolve the above-mentioned problem, a substrate processing system according to the present invention comprises: a plurality of substrate processing apparatuses for processing substrates; a group administration apparatus for administering the substrate processing apparatuses; and a plurality of operation terminals each for, when connected to the group administration apparatus, generating a data acquisition request format that sets forth retrieval conditions and types of display items classified in individual tables for the substrate processing apparatuses, and then transmitting it to the group administration apparatus.

Here, the group administration apparatus is characterized by, at the time of data acquisition request from the operation terminals, extracting, from among the data acquisition request formats acquired from the plurality of operation terminals, data acquisition request formats of the same substrate processing apparatus and merging the display items to be retrieved with the same retrieval condition so as to generate a merge table.

According to the present invention, by virtue of a group dividing function and a data merging function for the data of a group administration apparatus, a possibility is avoided that a delay arises in the data acquisition of a GUI terminal when a display data acquisition request is issued from the GUI terminal. Further, when data retrieval is performed inside a group administration apparatus, data is merged so that the data retrieval load can be reduced or that the amount of internal memory usage can be reduced. Furthermore, duplicated data retrieval which occurs in the related art is avoided, and hence the retrieval time can be reduced.

BRIEF DESCRIPTION OF THE DRAWINGS

FIG. 6 is a diagram showing a merge data administration table in a group administration apparatus shown in FIG. 1.

DESCRIPTION OF PREFERRED EMBODIMENTS

Figure 1:
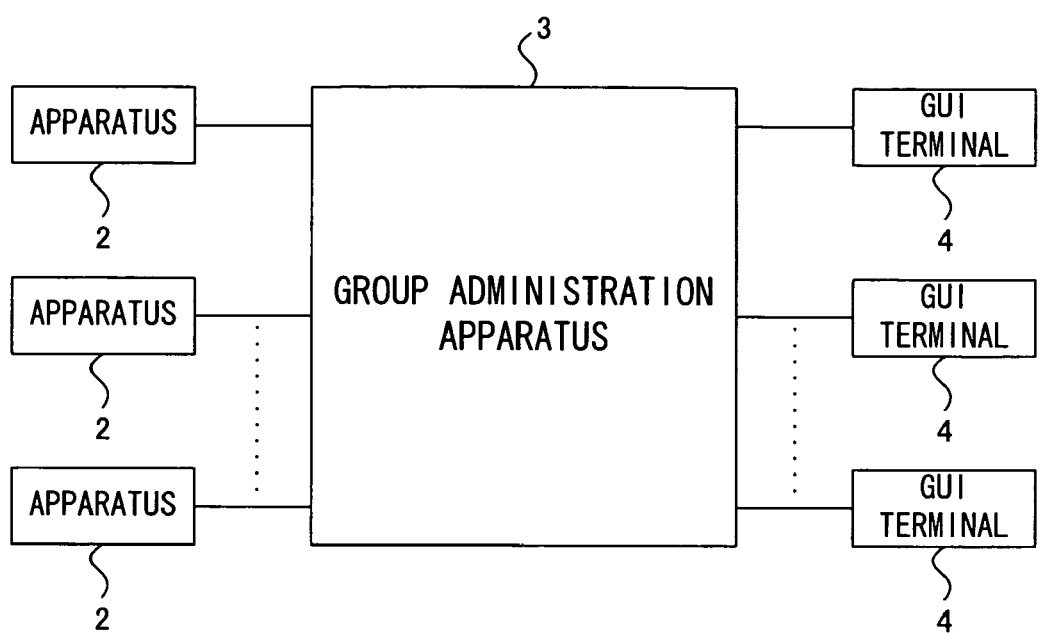
FIG. 1 is a basic configuration diagram of a substrate processing system according to the present invention.

First, the outline of a substrate processing system according to the present invention is described below. FIG. 1 is a basic configuration diagram of a substrate processing system according to the present invention. As shown in FIG. 1, in the substrate processing system of the present invention, a group administration apparatus 3 capable of administering information of a plurality of apparatuses 2 in a unified manner accumulates data of the plurality of apparatuses 2. Then, these apparatuses (i.e., the plurality of apparatuses 2 and the group administration apparatus 3) are connected through a network. Further, a plurality of GUI terminals 4 capable of displaying data of the plurality of apparatuses 2 (i.e., terminals capable of displaying data of the apparatuses 2) are connected to the group administration apparatus 3 through the network. In the configuration shown in FIG. 1, the substrate processing system of the present invention realizes efficient retrieval means for data to be displayed on the plurality of GUI terminals 4.

In the configuration of the substrate processing system shown in FIG. 1, in response to an apparatus data acquisition request to a particular apparatus 2 generated periodically from the plurality of GUI terminals 4, data types to be retrieved with the same retrieval condition are merged into one retrieval item so that the number of times of retrieval for apparatus data can be reduced. That is, data (apparatus data) transmitted from the semiconductor manufacturing apparatus (apparatus 2) to the group administration apparatus 3 include: the state of the apparatus itself; information of wafers; temperature information; gas flow rate information; pressure information; and various sensor information, which are owned by the apparatus 2. These pieces of information are classified into individual groups, and detailed data is present in the groups. For example, in the case of the temperature information, a temperature setting value, a monitored value, a cascade monitored value, a profile monitor value, a heater power monitor value, and the like are defined as a temperature information group. Thus, when the temperature information is to be displayed on a GUI terminal 4, a temperature information group is set into the retrieval condition for each display item, while the temperature setting value and the temperature monitor value are set with each type. Then, these data pieces are transferred to the group administration apparatus 3.

On the other hand, in the group administration apparatus 3, with reference to the retrieval conditions of a plurality of display items acquired from the GUI terminal 4, display items of the same condition (the "temperature information group", in this case) are merged into one retrieval item. As such, when retrieval conditions are merged into one, data acquisition for the apparatus data accumulated in the group administration apparatus 3 can be performed by retrieval on a group basis. Although the GUI terminals 4 are present in a plural number, retrieval can be performed on a group basis in the group administration apparatus 3, apparatus data can be acquired without the necessity of paying attention to the number of GUI terminals 4.

This reduces the retrieval load for the apparatus 2 data in the group administration apparatus 3. Thus, a retrieval method is realized in which an appropriate retrieval result can be returned to each GUI terminal 4 without generation of a delay in the retrieval time and in which a plurality of GUI terminals 4 can be processed. That is, a merge data retrieval method is realized in which data of a plurality of apparatuses 2 required by a plurality of GUI terminals 4 connected to a group administration apparatus 3 is retrieved. Further realized are: a merge data administration method for a plurality of GUI terminals 4 performed by a group administration apparatus 3; and a merge data expanding method to a plurality of GUI terminals 4. Here, the term "merge" indicates to combine a plurality of files into one file by using a computer.

Here, the reason why the merge is possible is that in the group administration apparatus 3, when a data acquisition request is received from a GUI terminal 4, a merge table and a merge data administration table are reconstructed together with the information of GUI terminals 4 under present connection. Here, the timing that a data acquisition request format is transmitted from a GUI terminal 4 is only that the GUI terminal 4 goes into connection. After that, the group administration apparatus 3 periodically issues a data acquisition response to the GUI terminal 4 on the basis of the merged data.

Next, an embodiment of the substrate processing system according to the present invention is described below in detail. First, unification of data acquisition request formats from the GUI terminals 4 is described with reference to FIG. 2. This figure shows an example of definition of an apparatus data acquisition request format to be displayed on a GUI terminal 4 for improving the retrieval efficiency of the apparatus 2 data in the group administration apparatus 3. The right-hand side part shows a display image group of each GUI terminal 4, while the left-hand side part shows a display data acquisition request format generated by each GUI terminal 4.

Figure 2:
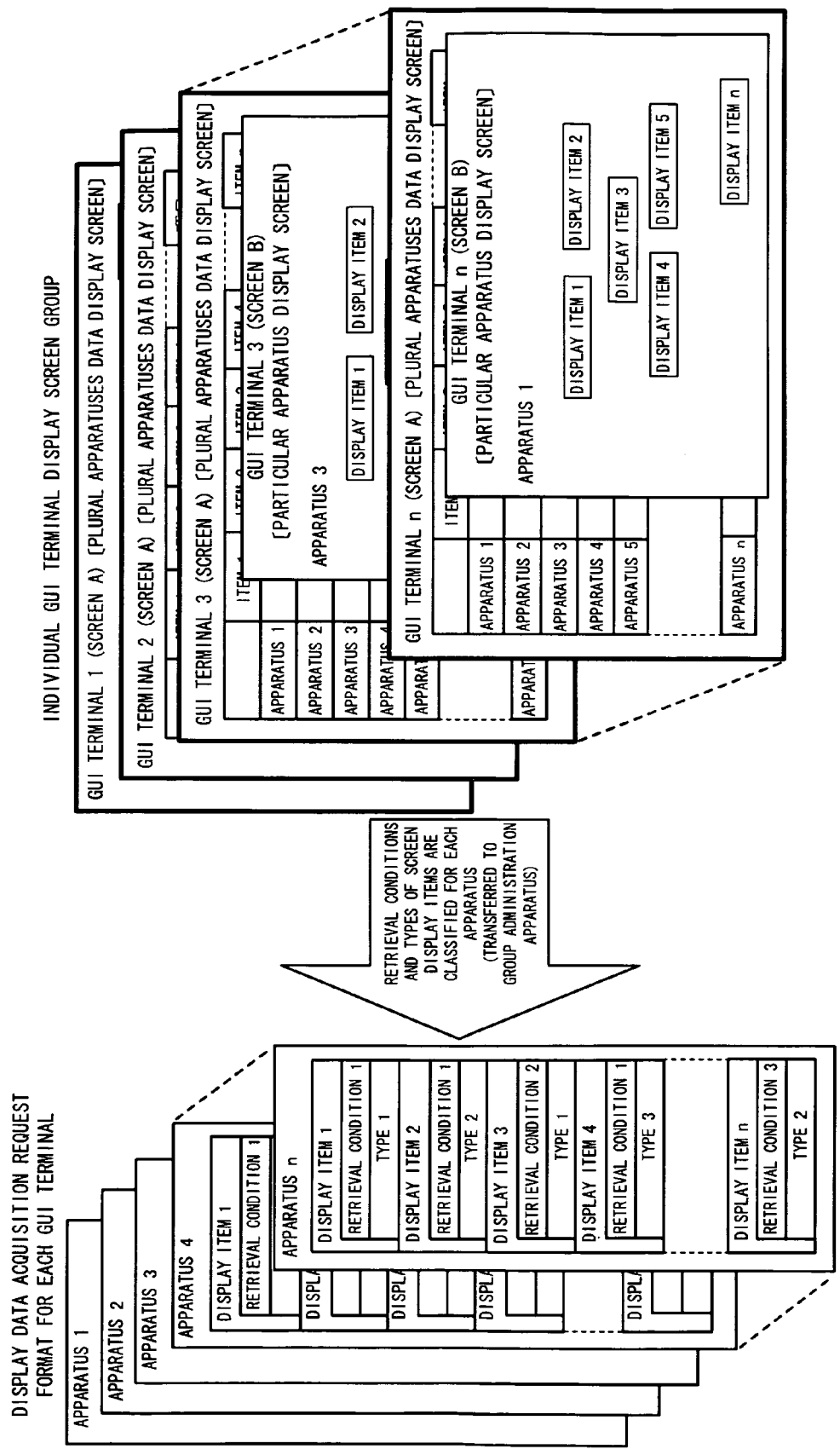
FIG. 2 is a diagram showing an example of a format used at the time of GUI terminal display data acquisition request in a substrate processing system of the present invention.

As shown in FIG. 2, each GUI terminal 4 has a plurality of screen displaying patterns. Then, in any case of a screen displaying pattern, retrieval conditions and display data types are defined on a to-be-displayed data item basis (for each apparatus) (i.e., a data acquisition request format as shown in the left-hand side part of FIG. 2 is generated), then classified on an apparatus 2 basis, and then transferred to the group administration apparatus 3. Here, the left-hand side part of FIG. 2 shows one format in the display image group of each GUI terminal 4 on the right-hand side part of FIG. 2.

In the group administration apparatus 3, merge is performed on the basis of the definition of the retrieval conditions and the types of the screen display items of each GUI terminal 4. For the purpose of this, a unified format is employed in the information transmitted from the individual GUI terminals 4.

Figure 3:
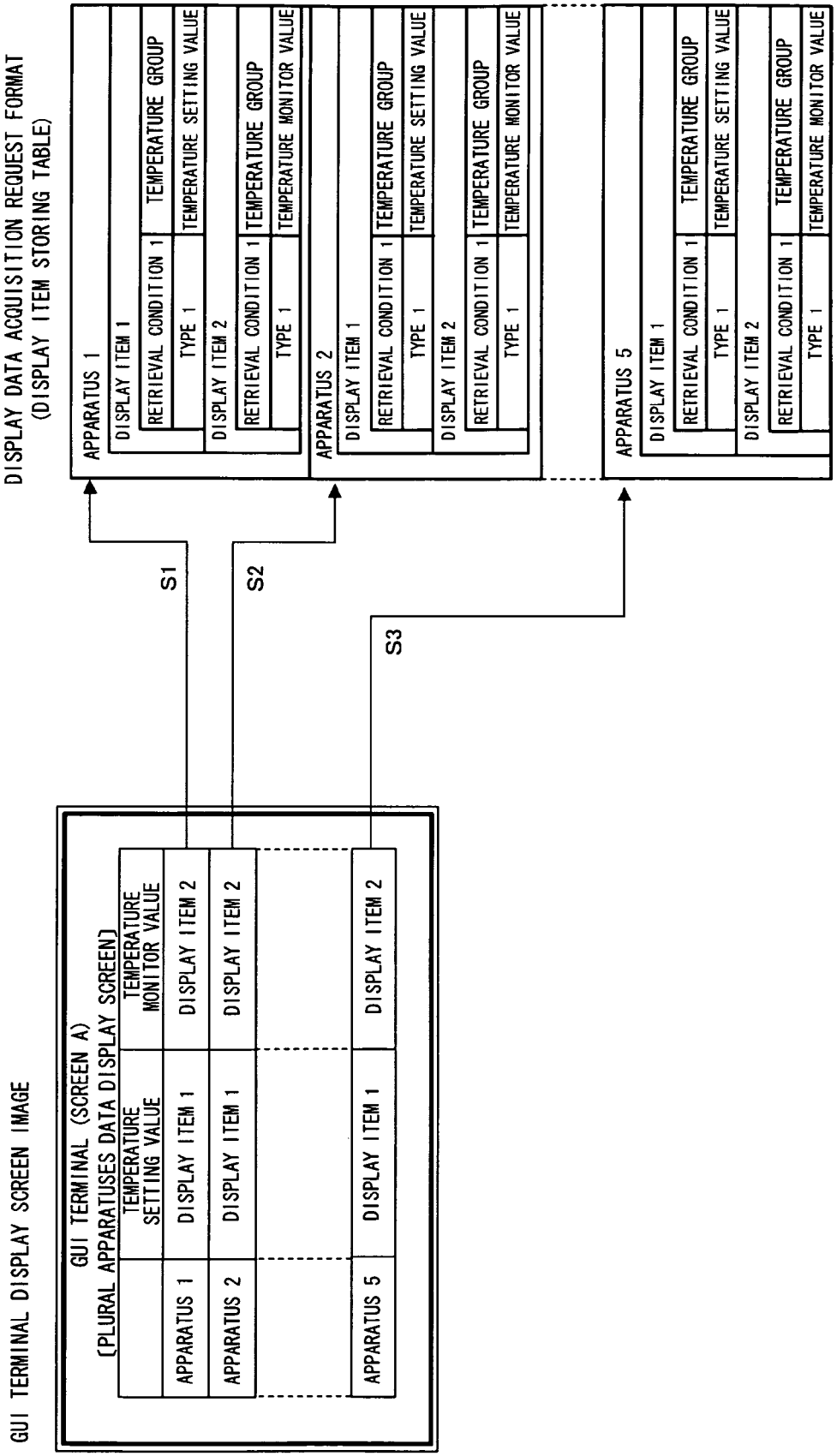
FIG. 3 is a diagram showing a detailed example of a format used at the time of GUI terminal display data acquisition request shown in FIG. 2.

Next, a detailed example is given for the format used at the time of a particular screen (screen A) display data acquisition request of a GUI terminal in the substrate processing system. FIG. 3 is a diagram showing a detailed example of a format used at the time of a particular screen (screen A) display data acquisition request of the GUI terminal shown in FIG. 2. That is, FIG. 3 shows the relation between a GUI terminal display screen image and a display data acquisition request format (display item storing table) to be transferred to the group administration apparatus 3, in a case that a GUI terminal 4 is to display temperature setting values and temperature monitor values of the individual apparatuses 2 (apparatuses 1, 2, . . . , 5 in FIG. 3 in terms of apparatus numbers). Here, obviously, the number of apparatuses is not limited to five.

Here, in the figures at and after FIG. 3, the apparatuses are designated as apparatuses 1, 2, . . . , 5 in terms of apparatus numbers in place of the reference numeral (i.e., the apparatuses 2 in FIG. 1). Similarly, the GUI terminals are designated as GUI terminals 1, 2, . . . , n in terms of GUI terminal numbers in place of the reference numeral (i.e., the GUI terminals 4 in FIG. 1).

At step S1 of FIG. 3, the temperature setting value of the apparatus 1 is set to be a display item 1 of the apparatus 1 in the "display item storing table". In this case, since the data is a temperature, the retrieval condition is set to be a "temperature group". Further, the temperature monitor value of the apparatus 1 is set to be a display item 2 of the apparatus 1 in the "display item storing table". Also in this case, since the data is a temperature, the retrieval condition is set to be a "temperature group". Next, at step S2, similarly to the above-mentioned case, the temperature setting value and the temperature monitor value of the apparatus 2 are set to be a display item 1 and a display item 2 of the apparatus 2 in the "display item storing table". In the subsequent procedure, as at step S3, display items are additionally set to be a display item 1 and a display item 2 for each apparatus in the "display item storing table".

Figure 4:
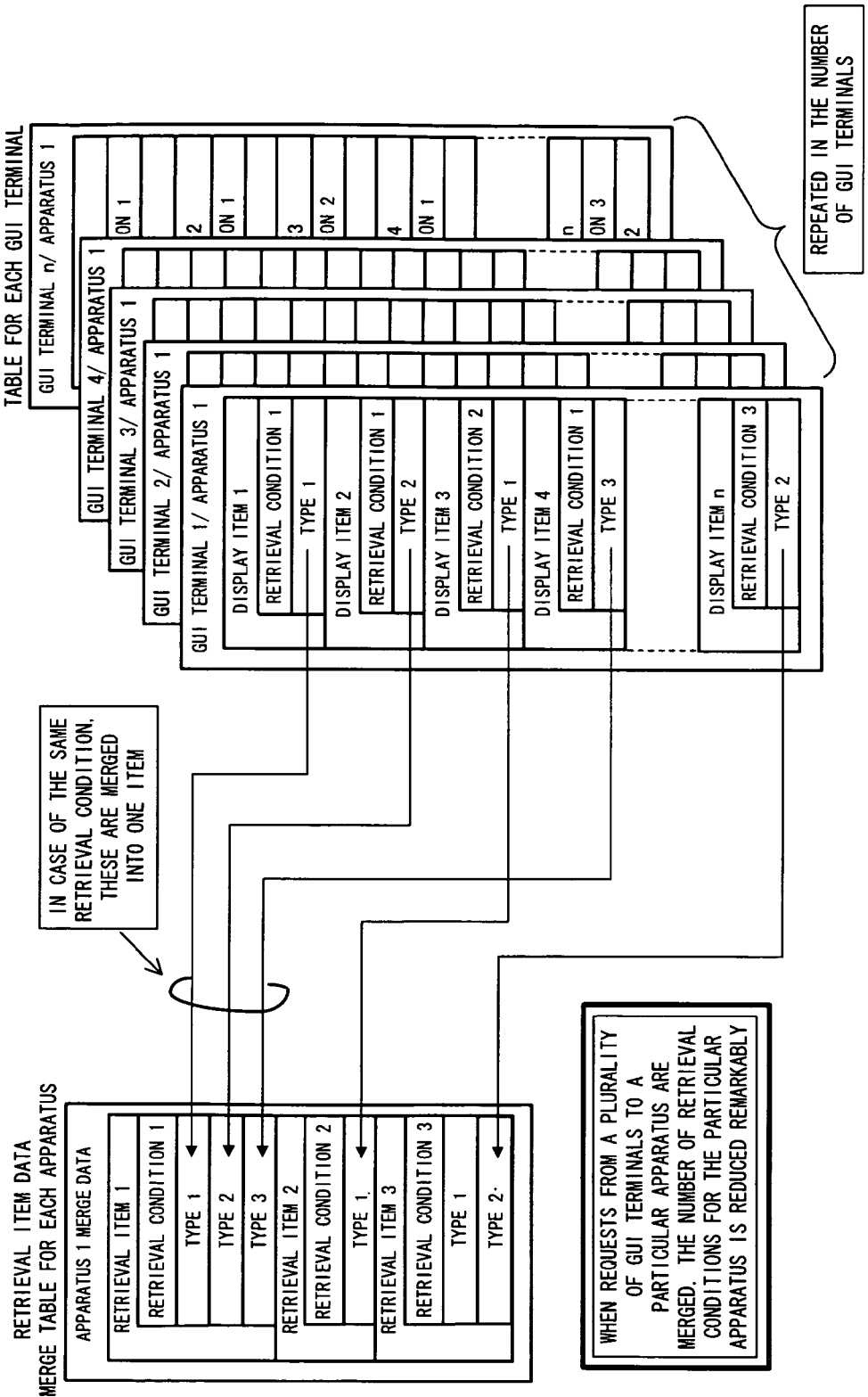
FIG. 4 is a conceptual diagram of an apparatus data retrieval item merge method in a group administration apparatus in a substrate processing system of the present invention.

Next, description is given for a merge method for apparatus data retrieval items in the group administration apparatus. FIG. 4 is a conceptual diagram of an apparatus data retrieval item merge method in the group administration apparatus in the substrate processing system of the present invention. That is, this figure shows a merge method for efficiently retrieving apparatus data accumulated in the group administration apparatus, in accordance with a data display item acquired from a GUI terminal. The right-hand side part shows a display item storing table for each GUI terminal unit, while the left-hand side part shows a retrieval item data merge table for each apparatus.

Here, the definition of the merge data administration table is described below. The merge data administration table is a table used for the purpose of reducing the number of times of retrieval acquisition of data to be reported from the semiconductor manufacturing apparatuses and for efficiently expanding without an error the data acquired as a retrieval result into the corresponding items of each GUI terminal.

As shown in FIG. 4, in the group administration apparatus, information (i.e., display data acquisition request formats) acquired from the individual GUI terminals are stored in internal tables for the individual GUI terminals (i.e., display item storing tables for the individual GUI terminals in the right-hand side part of FIG. 4). Then, from the stored information of the individual GUI terminals, information of the same apparatus is acquired, and then the display data type in each display item of the same retrieval condition is stored into the retrieval item data merge table for each apparatus in the left-hand side part of FIG. 4. That is, the types of display data of the same retrieval condition are merged into one item and then stored into a merge table (i.e., the retrieval item data merge table for each apparatus in the left-hand side part). By virtue of this, requests from a plurality of the GUI terminals to a particular apparatus are merged so that the number of retrieval conditions is reduced remarkably.

Here, in the internal tables shown in the right-hand side part of FIG. 4, "GUI terminals 1, 2, . . . , n/apparatus 1" indicates that 1, 2, . . . , n GUI terminals for displaying the data of the apparatus 1 are connected to the group administration apparatus 3. The display item indicates an item to be displayed on the GUI terminals (e.g., "1" indicates the display item 1). The retrieval condition indicates a condition on the basis of which the group administration apparatus 3 retrieves the data in a data accumulation area (e.g., "1" indicates a retrieval condition 1). The type indicates the type of an item to be displayed on the GUI terminal (e.g., "1" indicates a type 1). Further, the retrieval item is the same as the display item. Thus, when the same display items are present, expression is changed according to an idea of merging into one retrieval item.

Figure 5:
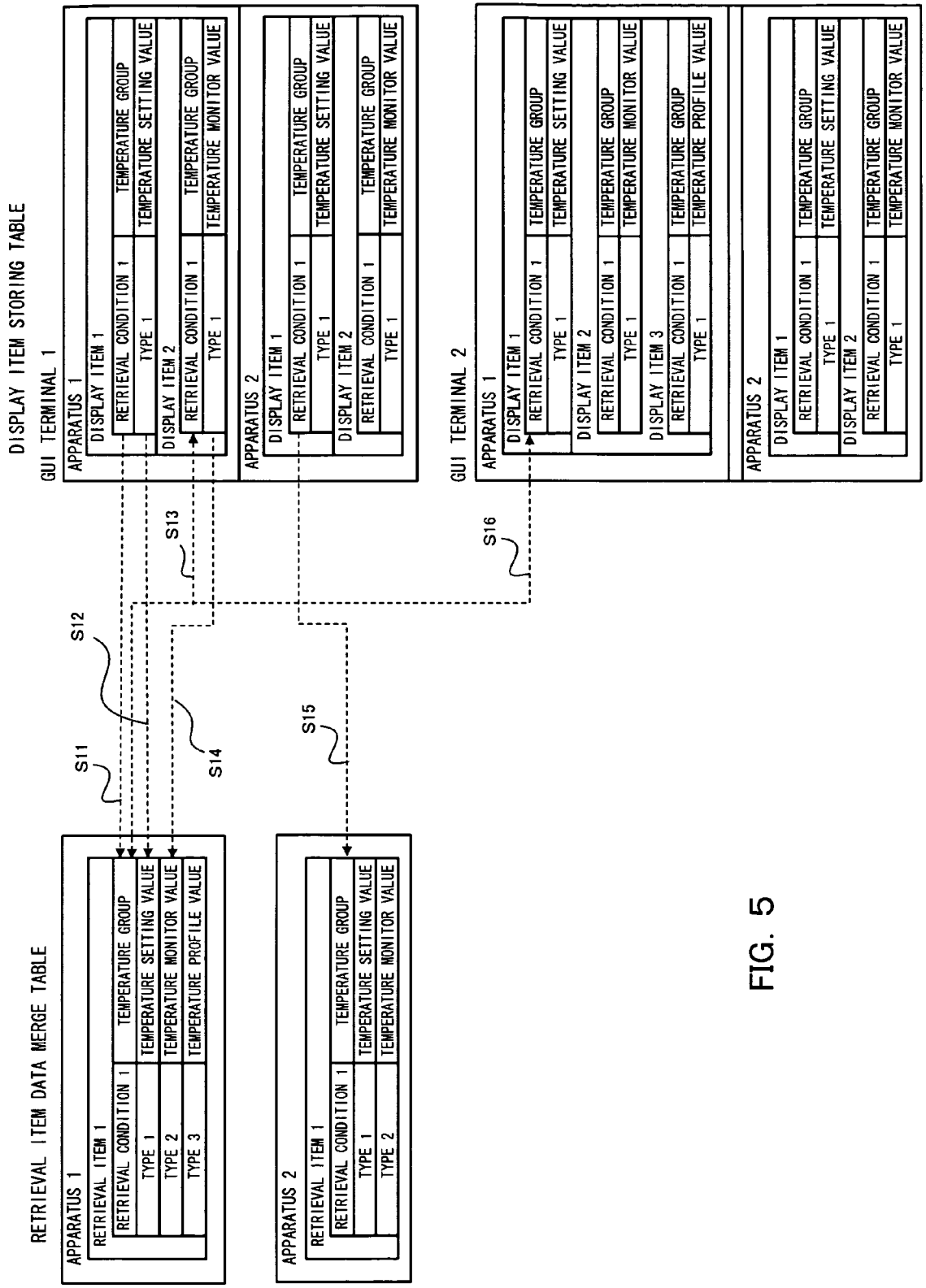
FIG. 5 is a conceptual diagram showing a detailed example of an apparatus data retrieval item data merge method in a group administration apparatus in the substrate processing system shown in FIG. 4.

FIG. 5 is a conceptual diagram showing a detailed example of an apparatus data retrieval method in the group administration apparatus in the substrate processing system shown in FIG. 4. A detailed example of the retrieval method shown in FIG. 4 is described below with reference to FIG. 5. Here, the right-hand side part of FIG. 5 shows display item storing tables, while the left-hand side part shows retrieval item data merge tables.

First, at step S11 of FIG. 5, the retrieval condition 1 of the display item 1 of the "apparatus 1" is extracted from the "display item storing table" acquired from "GUI terminal 1", and then set into the retrieval condition 1 of the retrieval item 1 of the "apparatus 1" in the "retrieval item data merge table". Next, at step S12, the type 1 of the display item 1 of the "apparatus 1" in the "display item storing table" is extracted and then set into the type 1 of the retrieval item 1 of the "apparatus 1" in the "retrieval item data merge table". Then, at step S13, the retrieval condition 1 of the display item 2 of the "apparatus 1" in the "display item storing table" is compared with the retrieval condition 1 of the retrieval item 1 of the "apparatus 1" in the "retrieval item data merge table".

As a result of comparison, when both retrieval conditions do not agree with each other, it is set to be the retrieval condition 2 of the retrieval item 2.

Here, when both retrieval conditions agree with each other, the type 1 of the display item 2 of the "apparatus 1" in the "display item storing table" is compared with the type 1 of the retrieval item 1 of the "apparatus 1" in the "retrieval item data merge table". Then, when both types agree with each other, both are determined as being the same retrieval item, and hence addition is not performed in the retrieval items.

At step S14, when both types do not agree with each other, comparison is performed with the subsequent type. When the type of comparison target is not present, it is added as a new type to the retrieval items. Then, at step S15, when a plurality of specified apparatuses are present, the processing of the above-mentioned steps S11 to S14 is repeated in a number of times equal to the number of apparatuses. Further, at step S16, when a plurality of GUI terminals are present, the processing of the above-mentioned steps S12 to S15 is repeated in a number of times equal to the number of GUI terminals.

Next, the merge data administration table is described below. FIG. 6 is a diagram showing a merge data administration table in the group administration apparatus 3 shown in FIG. 1. This figure shows a table that defines GUI terminal display items corresponding to merged retrieval items. That is, the merge data administration table shown in FIG. 6 is generated for recognizing that a merged display item corresponds to which display item of which GUI terminal.

Here, the GUI terminal display item information in FIG. 6 indicates the information of a display data acquisition request format transmitted from a GUI terminal. Further, merge data administration tables are generated in a number equal to the number of apparatuses 1 connected to the group administration apparatus 3. Further, the data retrieval result storing table is a table generated by storing the retrieval results into the retrieval item data merge table.

As shown in FIG. 6, when the information of the GUI terminal display item storing table and the information of the merge table are listed together, the location of the data can be recognized. This simplifies expansion from the merge data of an apparatus data retrieval result into GUI terminal display items.

Here, the merge data administration table is described below in further detail. The merge data administration table is a table for administering the correspondence between the type information in the "display item storing table" from the GUI terminal and the type information in the "retrieval item data merge table".

In the group administration apparatus 3, in a case that data retrieval is performed at each time when requests for display are received from a plurality of GUI terminals, retrieval takes a time and hence causes a delay in the retrieval so that an adverse influence arises in the screen drawing performance of the GUI terminals. Thus, as for the same item in the requests from the GUI terminals, data need be acquired at once. That is, the same items within the display items from the individual GUI terminals need be merged so that the number of times of retrieval need be reduced and thereby load at the time of retrieval need be reduced. Further, when the retrieved result data after the merge is transferred to each GUI terminal, the result data need be expanded in the order of request from the corresponding GUI terminal (i.e., in the order of display items and types). Thus, the merge data administration table is used as an administration table for permitting easy expansion of those contents.

Figure 7:
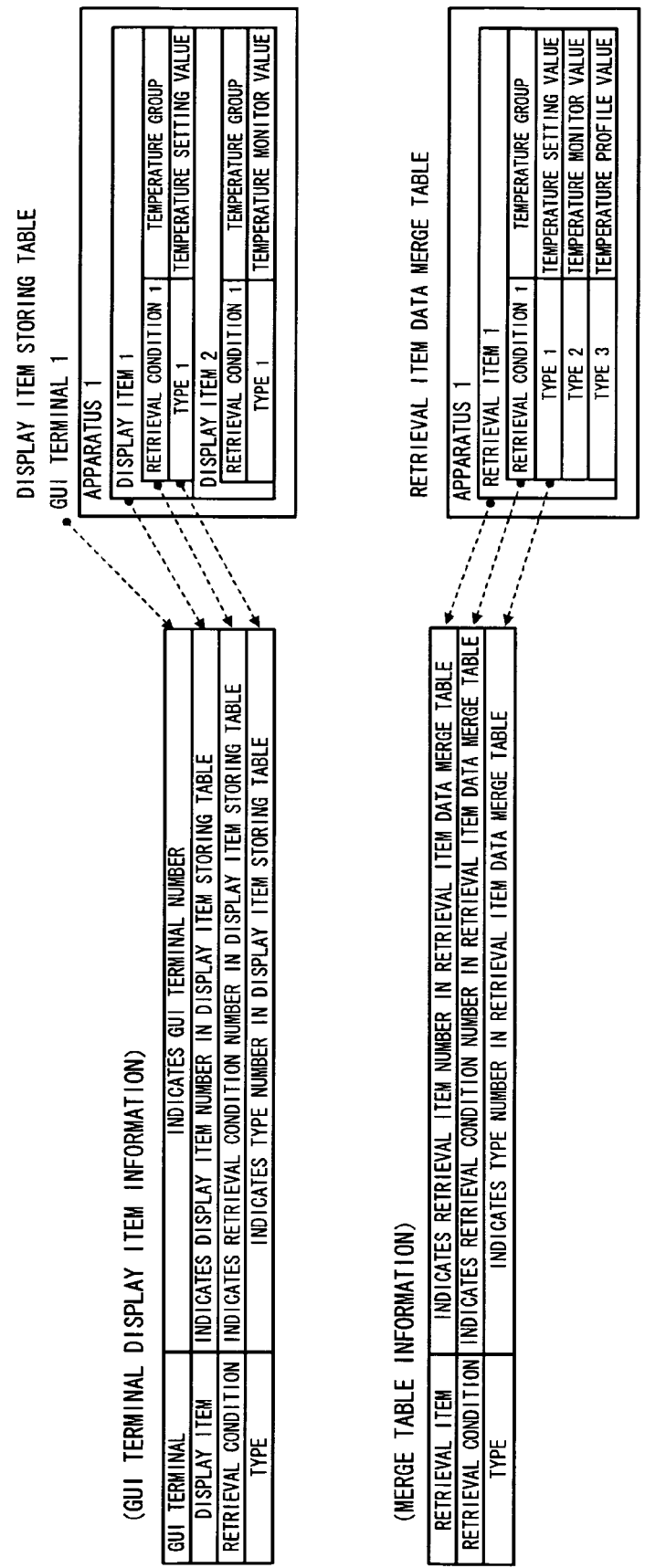
FIG. 7 is a conceptual diagram showing an expansion procedure for a merge data administration table shown in FIG. 6.

FIG. 7 is a conceptual diagram showing an expansion procedure for the merge data administration table shown in FIG. 6. The merge data administration table includes the items shown in FIG. 7, and is expanded as indicated by the arrows in the figure. As for the GUI terminal display item information, various kinds of information in the "display item storing table" acquired from the GUI terminal are administered on the basis of numbers. For example, a GUI terminal is designated by a GUI terminal number, while a display item of the GUI terminal is designated by a display item number in the display item storing table, and while a retrieval condition of the GUI terminal is designated by a retrieval condition number in the display item storing table. Further, the type of a GUI terminal is designated by a type number in the display item storing table.

Further, as for the merge table information, various kinds of information in the "retrieval item data merge table" for reducing the number of times of retrieval for apparatus acquired data are administered on the basis of numbers. For example, a retrieval item is designated by a retrieval item number in the retrieval item data merge table, while a retrieval condition is designated by a retrieval condition number in the retrieval item data merge table, and while a type is designated by a type number in the retrieval item data merge table.

Figure 8:
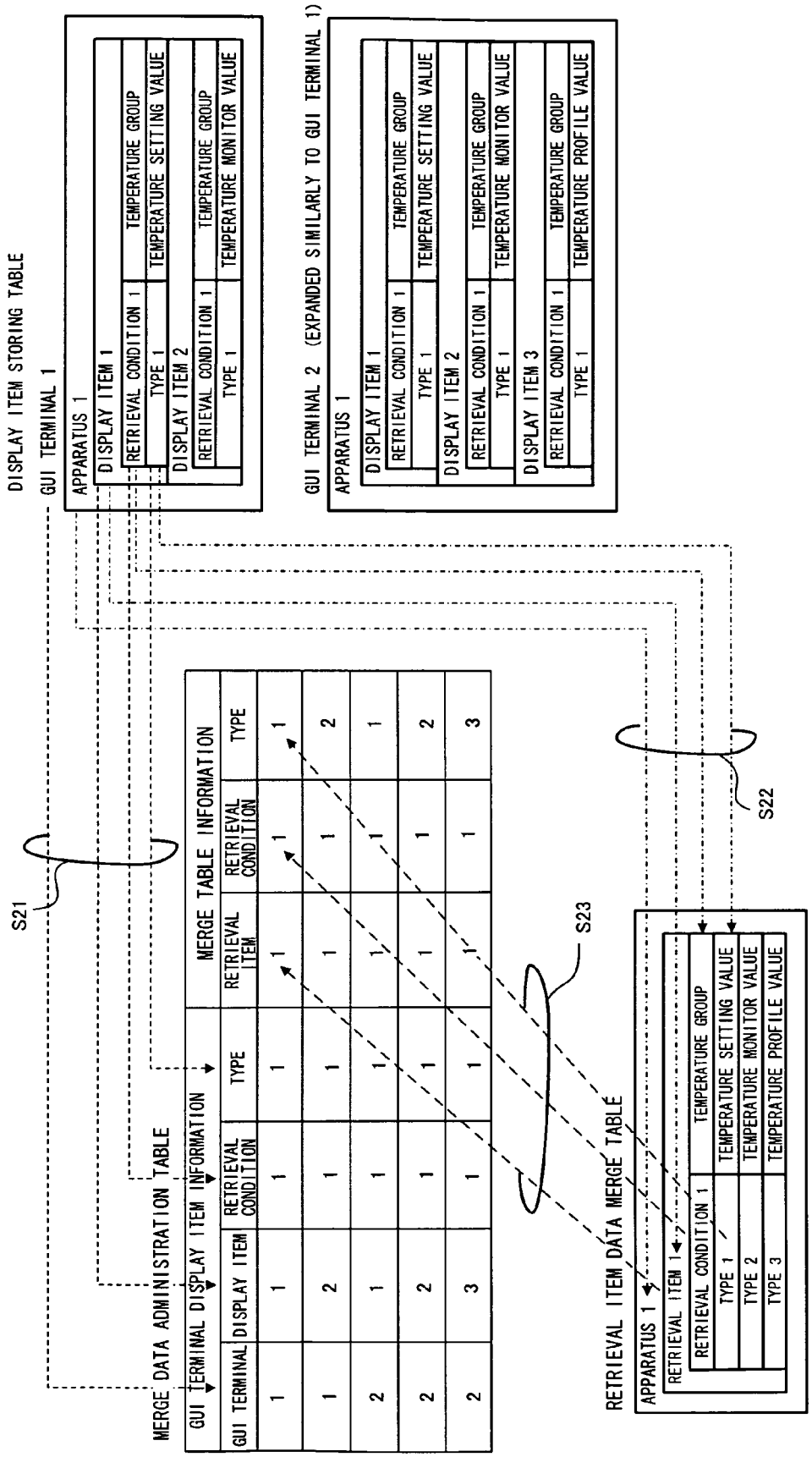
FIG. 8 is a flow chart showing an expansion procedure for a merge data administration table shown in FIG. 6.

FIG. 8 is a flow chart showing an expansion procedure for the merge data administration table shown in FIG. 6. Here, the timing of setting information into the merge data administration table is the same as the generation of the merge data. The procedure of information setting into the merge data administration table is as follows. That is, at step S21, the GUI terminal number, the display item number, the retrieval condition number, and the type number in the "display item storing table" are set up in a number equal to the number of GUI terminals, into the GUI terminal display item information in the "merge data administration table".

Further, at step S22, a "retrieval item data merge table" is generated from the information in the "display item storing table". The procedure at this time is the same as the procedure of steps S11 to S16 of the apparatus data retrieval method shown in the above-mentioned FIG. 5. Thus, duplicate description is omitted. Then, at step S23, at the time of setting of the "retrieved data merge table" performed at step S22, the corresponding information is expanded into the merge data administration table. As such, the above-mentioned steps S21 to S23 are repeated for all the display items of all GUI terminals 4.

Figure 9:
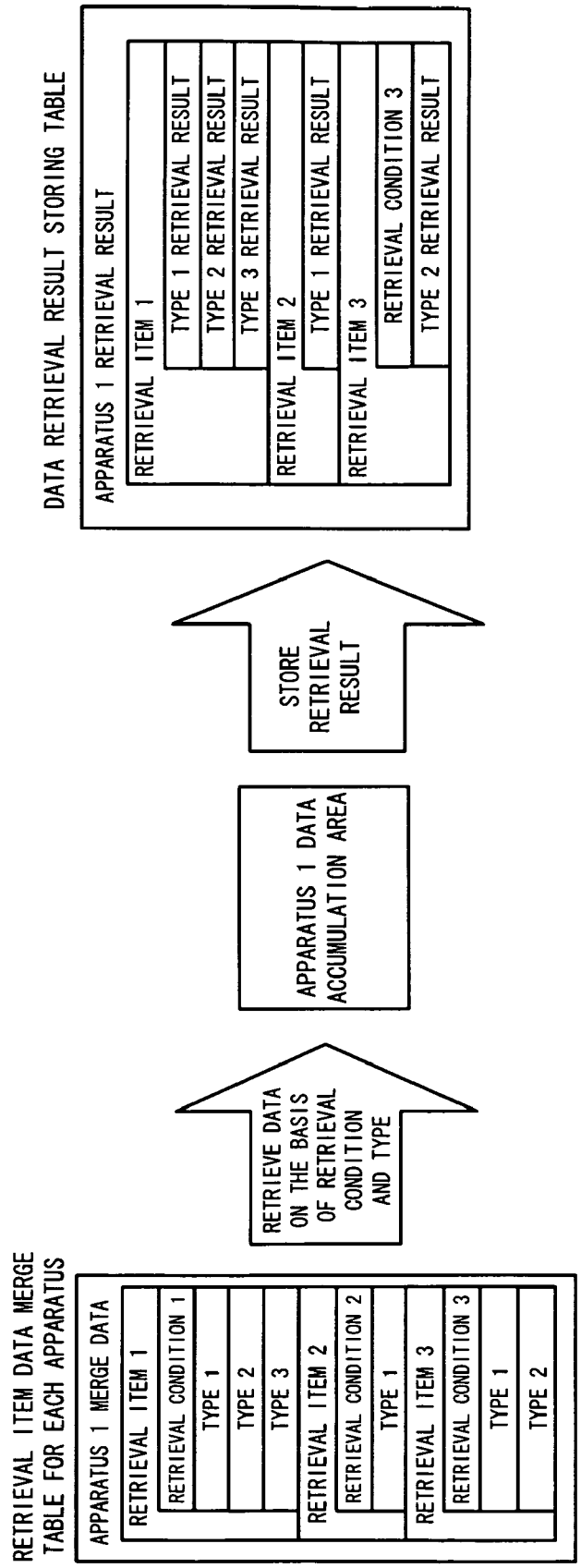
FIG. 9 is a conceptual diagram showing the situation of expansion into a data retrieval result storing table performed by a group administration apparatus shown in FIG. 1.

Next, description is given for a data retrieval result storing method. FIG. 9 is a conceptual diagram showing the situation of expansion into the data retrieval result storing table performed by the group administration apparatus 3 shown in FIG. 1. That is, FIG. 9 shows the flow into a table for storing retrieval results at the time of implementation of apparatus data retrieval in accordance with retrieval items. The left-hand side part shows a retrieval item data merge table for each apparatus, while the right-hand side part shows a data retrieval result storing table.

First, using the generated merge data, data retrieval for apparatus information is performed on the basis of the retrieval condition and the type. Next, as for the retrieval result, an item in accordance with the type within the retrieval item of the merge data is stored into the retrieval result storing table. Here, the retrieval condition at this time is unnecessary. That is, as shown in FIG. 9, the data is retrieved on the basis of the retrieval condition and the type, and then stored, for example, into the data accumulation area of the "apparatus 1". Then, the retrieval result is stored into the data retrieval result storing table.

Figure 10:
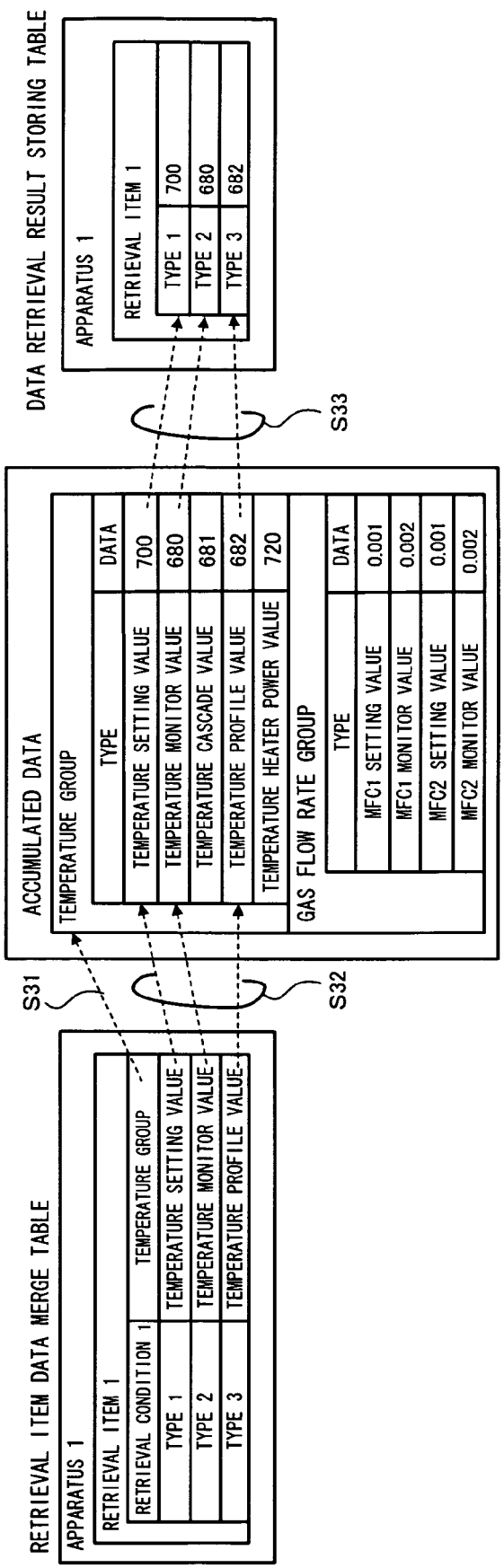
FIG. 10 is an expansion diagram showing a detailed example of expansion into a data retrieval result storing table shown in FIG. 9.

FIG. 10 is an expansion diagram showing a detailed example of expansion into a data retrieval result storing table shown in FIG. 9. First, at step S31, a temperature group that agrees with the retrieval condition 1 in the "retrieval item data merge table" is retrieved from the accumulated data. Next, at step S32, when a temperature group that agrees at step S31 is present, the individual types within the same group in the "retrieval item data merge table" are retrieved sequentially. Then, at step S33, the result retrieved at step S32 is set into the "data retrieval result storing table".

Figure 11:
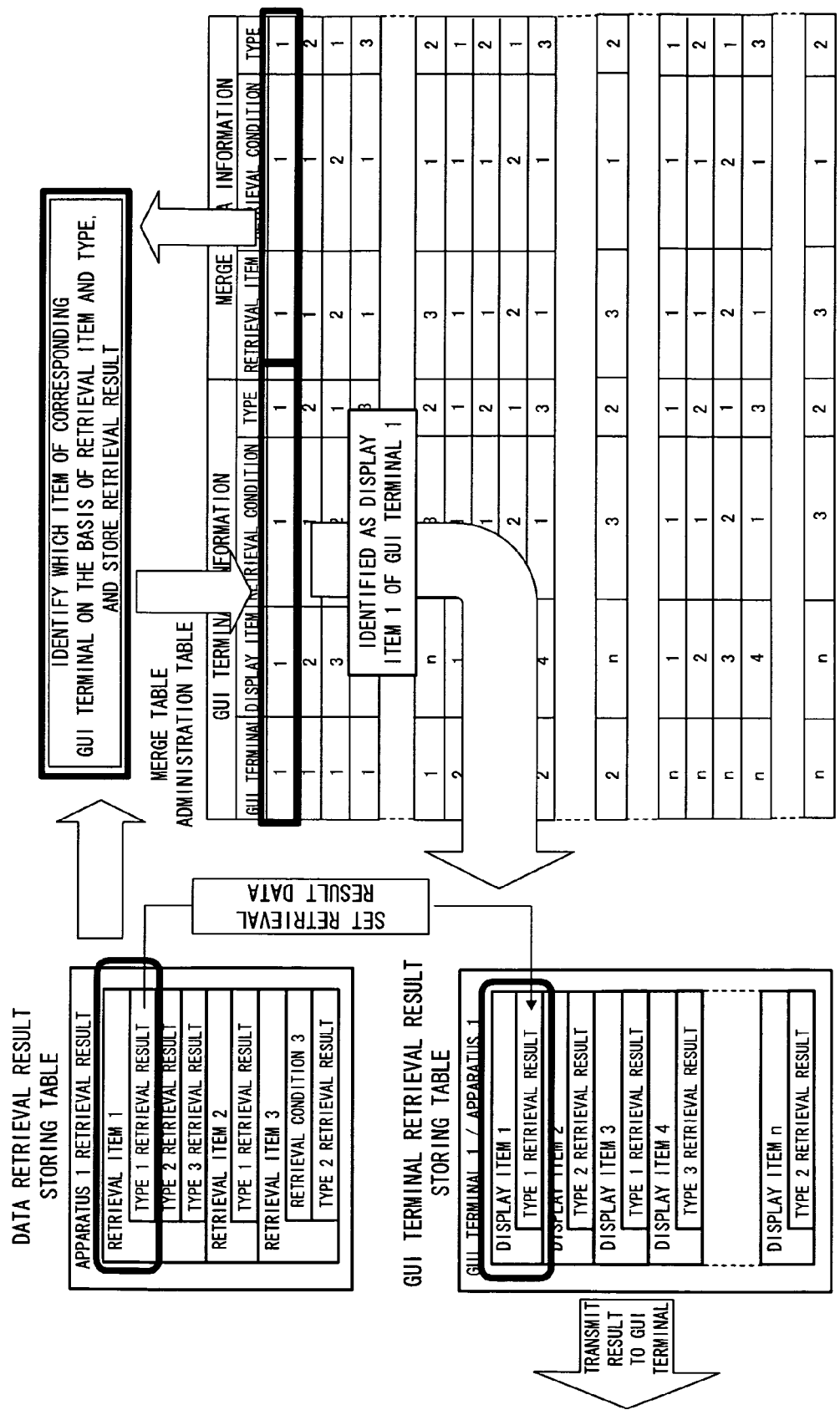
FIG. 11 is a conceptual diagram showing a flow in a data retrieval result expanding method performed by a group administration apparatus shown in FIG. 1.

Next, description is given for a data retrieval result expanding method. FIG. 11 is a conceptual diagram showing the flow in a data retrieval result expanding method performed by the group administration apparatus shown in FIG. 1. This figure shows the flow of expansion from a retrieval result of apparatus data into a GUI terminal retrieval result storing table. On the basis of the data retrieval result storing table and the merge data administration table, a GUI terminal retrieval result storing table to be transferred to each GUI terminal is generated. Then, the contents are transmitted to the corresponding GUI terminal. At that time, the corresponding item of the GUI terminal is identified on the basis of the retrieval item and the type, and then the retrieval result is stored.

Figure 12:
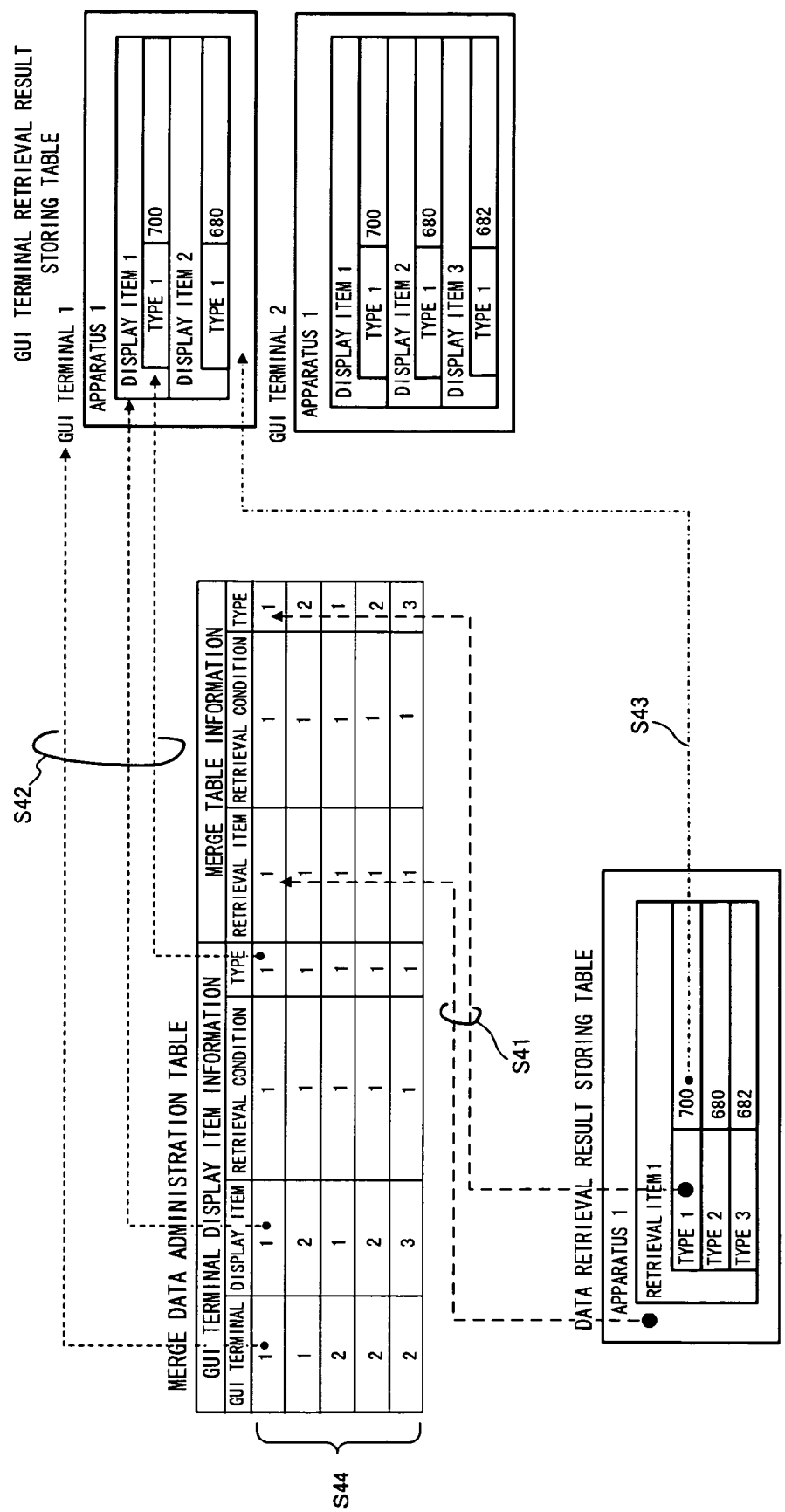
FIG. 12 is a flow chart showing a detailed flow of a data retrieval result expanding method shown in FIG. 11.

FIG. 12 is a flow chart showing a detailed flow of the data retrieval result expanding method shown in FIG. 11. In FIG. 12, first, at step S41, GUI terminal display item information that agrees with the retrieval item number and the type number in the data retrieval result storing table is acquired from the merge data administration table. Next, at step S42, on the basis of the information acquired at step S41 (i.e., the GUI terminal number, the display item, and the type), a corresponding position is obtained in the GUI terminal retrieval result storing table. Further, at step S43, the data acquired from the apparatus is set into the position obtained at step S42. Then, at step S44, the processing of steps S41 to S43 is repeated in a number of times equal to the number of lines stored in the merge data administration table.

Figure 13:
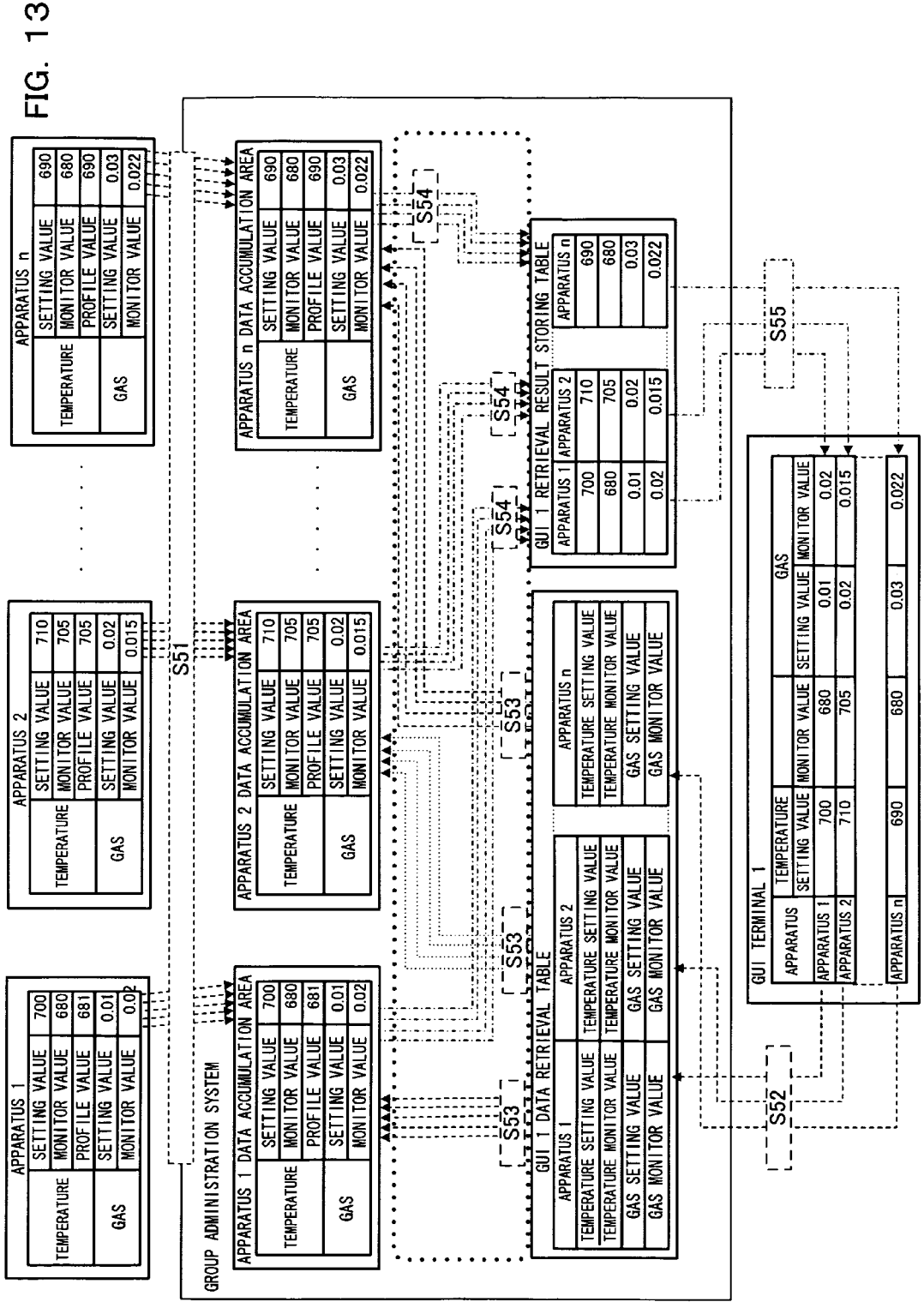
FIG. 13 is a flow chart showing a flow of data in a group administration apparatus in a substrate processing system of the present invention.
Figure 14:
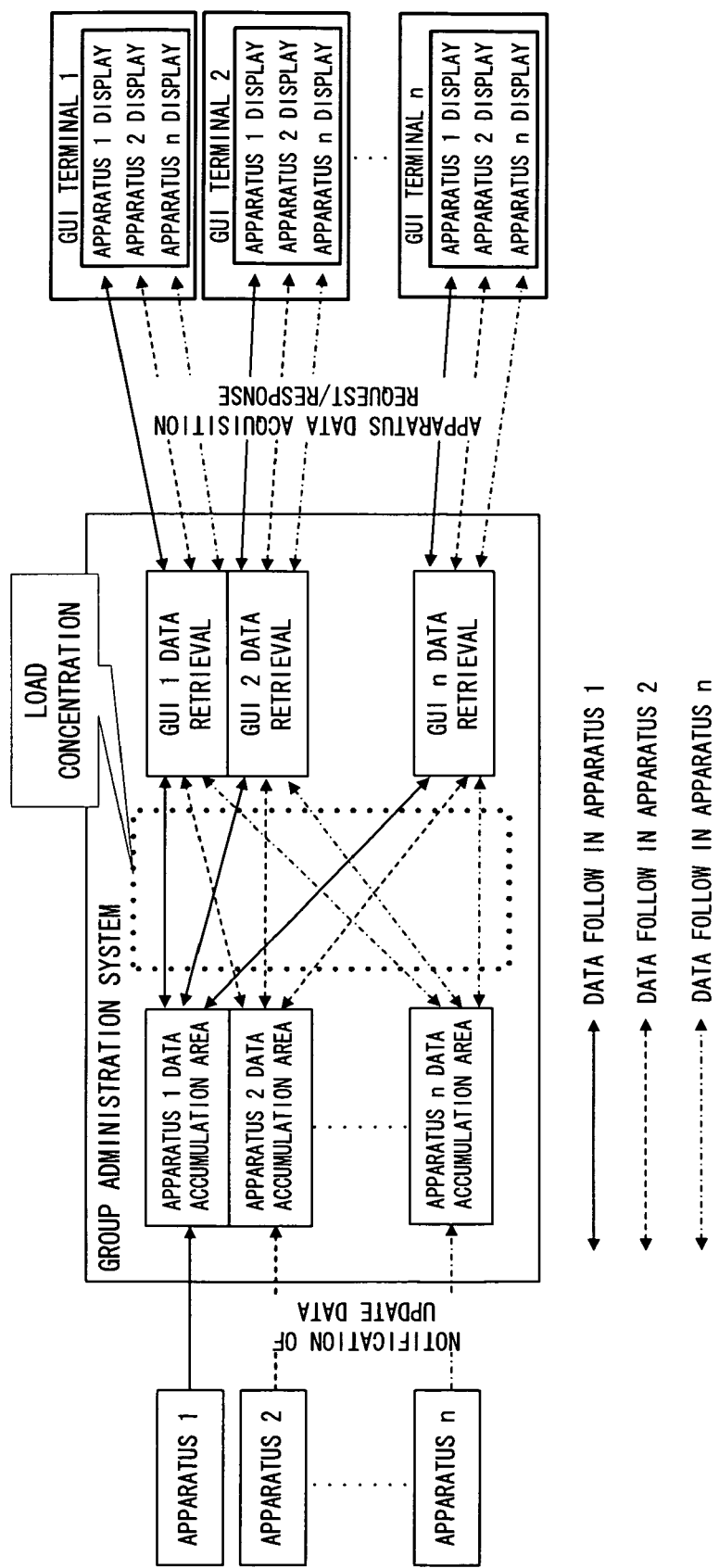
FIG. 14 is a conceptual diagram showing a flow of data in a common group administration apparatus.

Next, as a summary of the contents described above, a detailed example of a flow of data in the group administration apparatus 3 is described below. FIG. 13 is a flow chart showing a flow of data in the group administration apparatus 3 in the substrate processing system of the present invention. First, at step S51, the group administration apparatus 3 irregularly receives the newest apparatus information from each apparatus 2, and then accumulates it into the apparatus data accumulation area of itself. The apparatus information includes various kinds of information such as the device status, the wafer status, the temperature information, the gas flow rate information, the pressure information, and the sensor information.

Then, at step S52, the group administration apparatus 3 receives display data acquisition requests from the GUI terminals, and then stores the retrieval items in a manner classified for each apparatus unit into the data retrieval table. Further, at step S53, the group administration apparatus 3 retrieves corresponding data separately from the data accumulation area of the target device for the retrieval item stored in the data retrieval table of the GUI terminal. Next, at step S54, the group administration apparatus 4 stores the result retrieved at step S53 into the retrieval result storing table for each apparatus. Then, at step S55, the group administration apparatus 3 extracts the retrieval result data from the retrieval result storing table, and then returns it to the GUI terminal. By virtue of this, the GUI terminal appropriately displays the retrieval result acquired from the group administration apparatus 3.

The above-mentioned embodiment has been given for the case that the present invention is applied to semiconductor manufacturing apparatuses serving as the substrate processing apparatuses. However, obviously, the present embodiment is applicable to apparatuses such as LCD apparatuses that are other than semiconductor manufacturing apparatuses and that process glass substrates.

Figure 15:
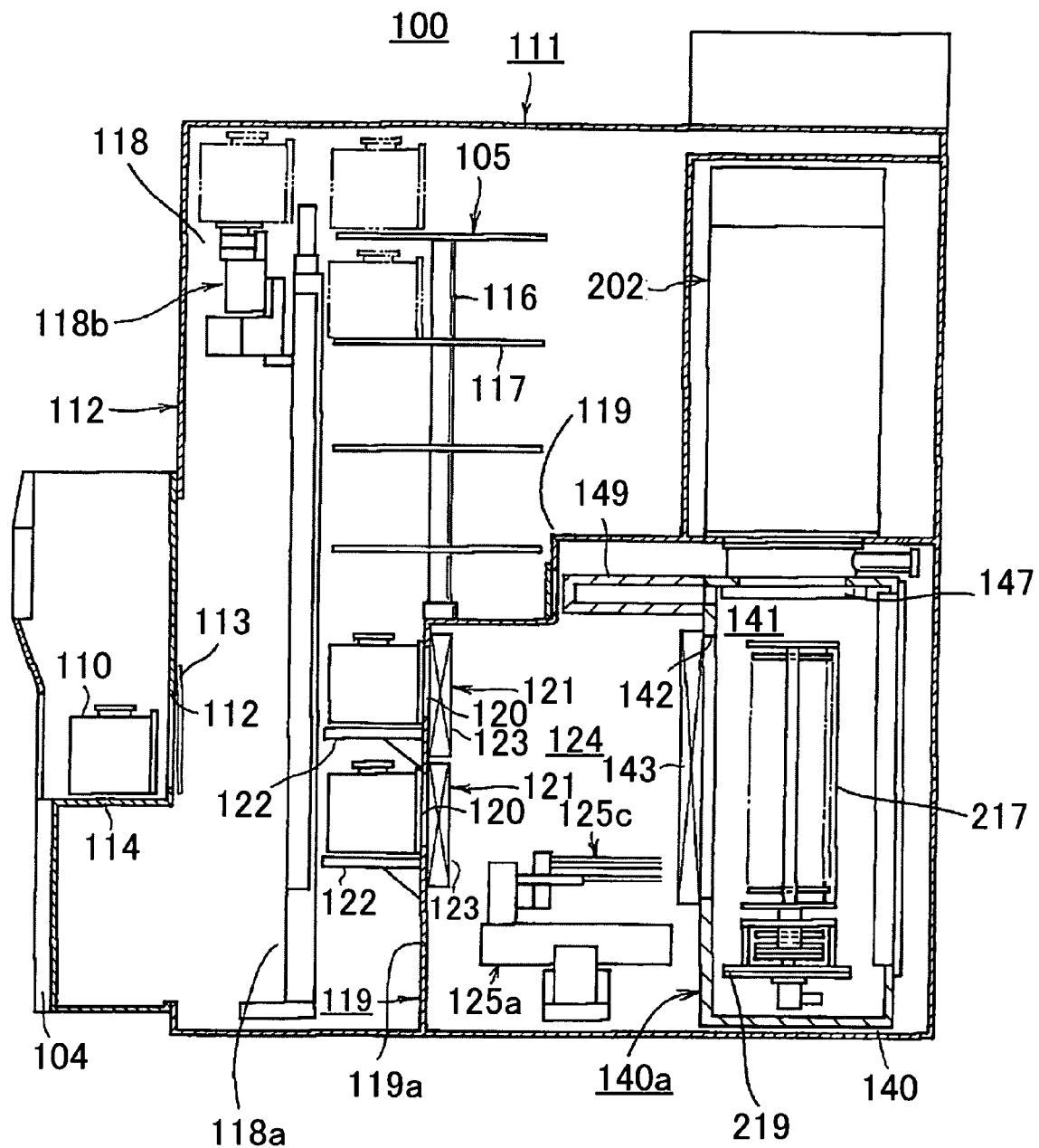
FIG. 15 is a perspective plane view of a processing apparatus applied to the present invention.

Next, description is given for a detailed embodiment of a substrate processing apparatus to which the present invention is applied. In the best mode for implementing the present invention, the substrate processing apparatus is, as an example, a semiconductor manufacturing apparatus for performing a process step in a manufacturing method for a semiconductor device (IC). Here, the following description is given for the case that the substrate processing apparatus is an apparatus of vertical type (simply referred to as a processing apparatus, hereinafter) for performing oxidization, diffusion processing, CVD processing, or the like on a substrate. FIG. 15 is a perspective plan view of the processing apparatus employed in the present invention. Further, FIG. 16 is a perspective side view of the processing apparatus shown in FIG. 15.

Figure 16:
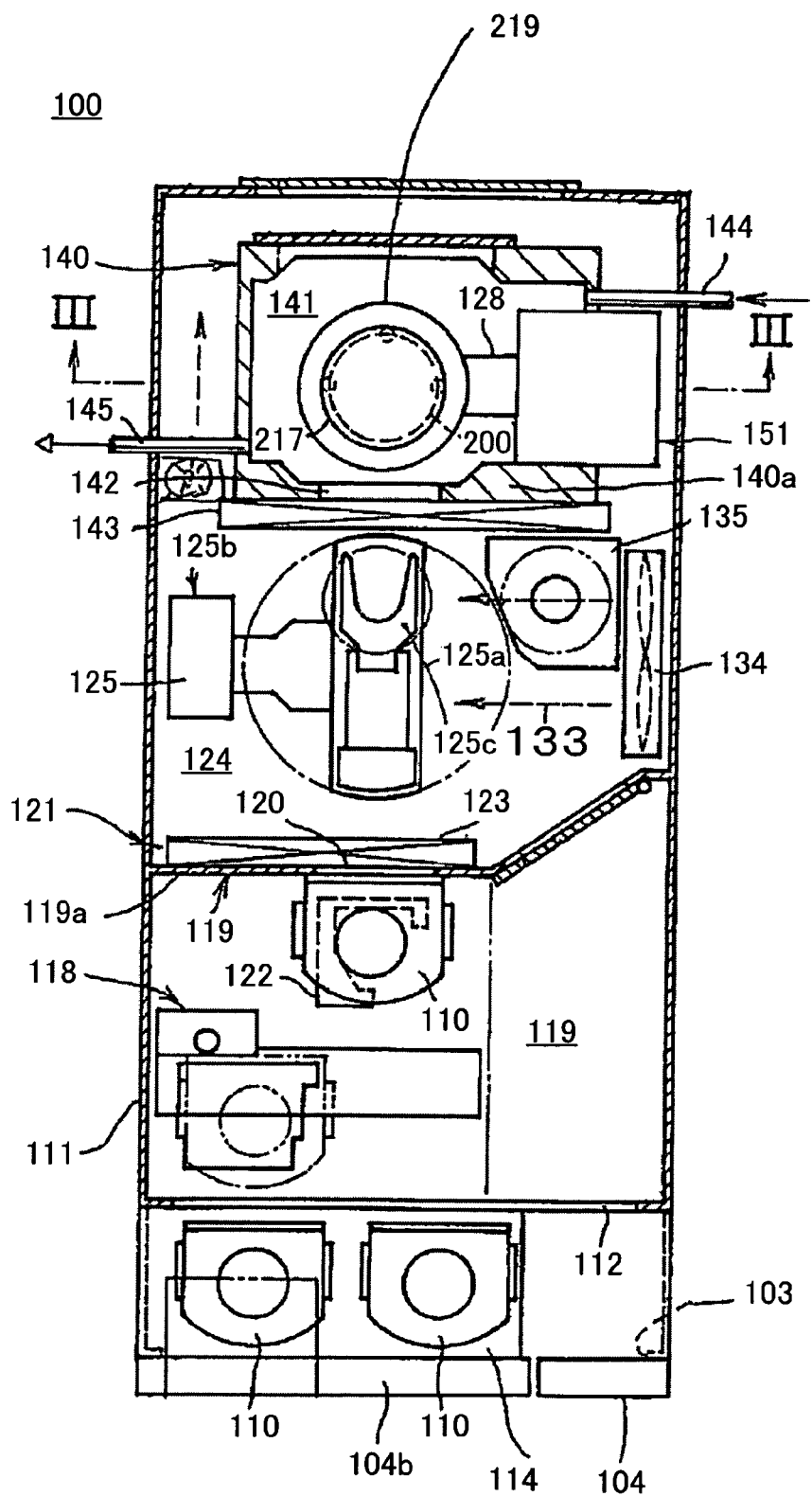
FIG. 16 is a perspective side view of a processing apparatus shown in FIG. 15.

As shown in FIGS. 15 and 16, a processing apparatus 100 of the present invention in which a hoop (a substrate accommodating vessel, referred to as a pod, hereinafter) 110 is employed as a wafer carrier for accommodating wafers (substrates) 200 composed of silicon or the like has a housing 111. In the front forward part of a front wall 111*a* of the housing 111, a front maintenance port 103 is opened that serves as an opening provided in a manner permitting maintenance. Further, front maintenance doors 104 and 104 are built respectively for opening and closing the front maintenance port 103.

In the front wall 111*a* of the housing 111, a pod carrying-in-and-out port (a substrate accommodating vessel carrying-in-and-out port) 112 is opened in a manner permitting fluid communication between the inside and the outside of the housing 111. The pod carrying-in-and-out port 112 is opened and closed by a front shutter (a substrate accommodating vessel carrying-in-and-out port opening and closing mechanism) 113. Further, a load port (a substrate accommodating vessel delivery bed) 114 is provided in the front forward side of the pod carrying-in-and-out port 112. The load port 114 performs positioning of a pod 110 placed thereon. The pod 110 is carried in onto the load port 114 and carried out from the load port 114 by an intra-process conveying machine (not shown).

In an upper part of an approximately center part in the forward and backward directions in the housing 111, a rotary type pod shelf (a substrate accommodating vessel placing shelf) 105 is provided. The rotary type pod shelf 105 stores a plurality of pods 110. That is, the rotary type pod shelf 105 has: a supporting rod 116 provided perpendicularly and rotated intermittently in a horizontal plane; and a plurality of shelf boards (substrate accommodating vessel placing beds) 117 supported in a radial direction by the supporting rod 116 at four positions in the up and down directions. Each of the plurality of shelf boards 117 holds a plurality of pods 110 placed thereon.

A pod conveying machine (a substrate accommodating vessel conveying machine) 118 is provided between the load port 114 and the rotary type pod shelf 105 inside the housing 111. The pod conveying machine 118 has: a pod elevator (a substrate accommodating vessel elevator mechanism) 118*a* capable of going up and down with holding the pods 110; and a pod conveying mechanism (a substrate accommodating vessel conveying mechanism) 118*b* serving as a conveying mechanism. Then, as a result of successive operation of the pod elevator 118*a* and the pod conveying mechanism 118*b*, the pod conveying machine 118 conveys the pods 110 between the load port 114, the rotary type pod shelf 105, and a pod opener (a substrate accommodating vessel lid opening and closing mechanism) 121.

In a lower part of an approximately center part in the forward and backward directions in the housing 111, a sub housing 119 is built over the back end. In the front wall 119*a* of the sub housing 119, a pair of wafer carrying-in-and-out ports (substrate carrying-in-and-out ports) 120 used for carrying in and out wafers 200 into and from the sub housing 119 are opened and arranged mutually at upper and lower positions in a perpendicular direction. A pair of pod openers 121 and 121 are provided respectively in the upper and lower wafer carrying-in-and-out ports 120 and 120.

The pod openers 121 have: placing beds 122 and 122 onto which pods 110 are placed; and cap attachment and detachment mechanisms (lid attachment and detachment mechanisms) 123 and 123 for attaching and detaching the caps (lids) of the pods 110. In each pod opener 121, the cap of a pod 110 placed on the placing bed 122 is attached and detached by the cap attachment and detachment mechanism 123, so that the wafer in-and-out port of the pod 110 is opened and closed.

The sub housing 119 constructs a transfer room 124 fluid-isolated from the installation space of the pod conveying machine 118 and the rotary type pod shelf 105. A wafer transfer mechanism (a substrate transfer mechanism) 125 is provided in a front side region of the transfer room 124. The wafer transfer mechanism 125 has: a wafer transfer machine (a substrate transfer machine) 125*a* capable of rotating or forwarding a wafer 200 in a horizontal direction; and a wafer transfer machine elevator (a substrate transfer machine elevator mechanism) 125*b* for moving up and down the wafer transfer machine 125*a*. As a result of successive operation of the wafer transfer machine elevator 125*b* and the wafer transfer machine 125*a*, tweezers (a substrate holder) 125*c* of the wafer transfer machine 125*a* serve as a placement section for a wafer 200 so as to charge and discharge the wafer 200 onto and from a boat (a substrate holding piece) 217.

As shown in FIG. 15, in a right-hand side end section opposite to the wafer transfer machine elevator 125*b* side in the transfer room 124, a clean unit 134 is provided that has a supply fan and a dustproof filter so as to supply clean air 133 which is cleaned atmosphere or inert gas. Between the wafer transfer machine 125*a* and the clean unit 134, a notch orienting machine 135 is provided that serves as a substrate matching machine for orienting the position of the wafer in the circumferential direction.

The clean air 133 supplied from the clean unit 134 follows through the notch orienting machine 135 and the wafer transfer machine 125*a*, and then is suctioned through a duct not shown. Then, the clean air 133 is exhausted to the outside of the housing 111, or alternatively circulated to the primary side (supply side) which is the suction side of the clean unit 134 and then supplied into the transfer room 124 again by the clean unit 134.

In a rear side region of the transfer room 124, a housing having air tightness (referred to as a pressure-resistant housing, hereinafter) 140 is provided that can maintain a pressure (referred to as a negative pressure, hereinafter) less than the atmospheric pressure. This pressure-resistant housing 140 constructs a load lock chamber 141 that has a volume capable of accommodating a boat 217 and serves as a waiting chamber of load lock method.

In the front wall 140*a* of the pressure-resistant housing 140, a wafer carrying-in-and-out opening (a substrate carrying-in-and-out opening) 142 is opened. The wafer carrying-in-and-out opening 142 is opened and closed by a gate valve (a substrate carrying-in-and-out port opening and closing mechanism) 143. To a pair of side walls of the pressure-resistant housing 140, a gas supply pipe 144 for supplying nitrogen gas into the load lock chamber 141 and an exhaust pipe 145 for exhausting the load lock chamber 141 to a negative pressure are connected respectively.

A processing furnace 202 is provided above the load lock chamber 141. The bottom end of the processing furnace 202 is opened and closed by a furnace port gate valve (a furnace port opening and closing mechanism) 147. At the top end of the front wall 140*a* of the pressure-resistant housing 140, a furnace port gate valve cover 149 is attached for accommodating the furnace port gate valve 147 at the time of opening of the bottom end of the processing furnace 202.

As shown in FIG. 15, in the pressure-resistant housing 140, a boat elevator (a substrate holding piece elevator mechanism) 115 is provided for moving up and down the boat 217. A seal cap 219 serving as a lid is provided horizontally in an arm 128 serving as a connecting piece connected to a boat elevator 115. The seal cap 219 supports the boat 217 perpendicularly and can close the bottom end of the processing furnace 202.

The boat 217 has a plurality of holding members so as to hold a plurality (e.g., 50 to 125 or the like) of wafers 200 horizontally in an oriented state where their centers are aligned in a perpendicular direction.

Next, operation of the processing apparatus shown in FIGS. 15 and 16 is described below. As shown in FIGS. 15 and 16, when a pod 110 is supplied to the load port 114, the pod carrying-in-and-out port 112 is opened by a front shutter 113. The pod 110 on the load port 114 is carried into the housing 111 through the pod carrying-in-and-out port 112 by the pod conveying machine 118.

The pod 110 having been carried in is automatically conveyed and transferred to a specified shelf board 117 in the rotary type pod shelf 105 by the pod conveying machine 118. The pod 110 is stored there temporarily, then conveyed from the shelf board 117 to one pod opener 121, and then transferred and placed onto the placing bed 122. Alternatively, the pod 110 is directly conveyed to the pod opener 121 and transferred and placed onto the placing bed 122. At that time, the wafer carrying-in-and-out port 120 of the pod opener 121 is closed by the cap attachment and detachment mechanism 123, while the clean air 133 is supplied to and fills the transfer room 124. For example, the transfer room 124 is filled with nitrogen gas serving as the clean air 133, so that the oxygen concentration is reduced to 20 ppm or lower which is much lower than the oxygen concentration (of atmospheric air) in the inside of the housing 111.

In the pod 110 placed on the placing bed 122, its opening side edge is pressed against the opening edge side part of the wafer carrying-in-and-out port 120 in the front wall 119*a* of the sub housing 119, while its cap is removed by the cap attachment and detachment mechanism 123, so that the wafer in-and-out port of the pod 110 is opened. Further, when the wafer carrying-in-and-out opening 142 of the load lock chamber 141 the inside of which has been brought into an atmospheric pressure state in advance is opened by the operation of the gate valve 143, a wafer 200 is picked up from the pod 110 through the wafer in-and-out port by the tweezers 125*c* of the wafer transfer machine 125*a*. Then, the wafer is oriented by the notch orienting machine 135, then carried in to the load lock chamber 141 through the wafer carrying-in-and-out opening 142, and then transferred and charged onto the boat 217 (wafer charging) The wafer transfer machine 125*a* having delivered the wafer 200 to the boat 217 returns to the pod 110 and loads the next wafer 110 onto the boat 217.

During the charging operation for the wafer onto the boat 217 performed by the wafer transfer machine 125 in the one pod opener (the upper one or the lower one) 121, at the same time, another pod 110 is conveyed from the rotary type pod shelf 105 or the load port 114 to the other pod opener 121 (the lower one or the upper one) by the pod conveying machine 118 so that opening operation for the pod 110 is performed by the pod opener 121.

When wafers 200 in a number specified in advance are charged onto the boat 217, the wafer carrying-in-and-out opening 142 is closed by the gate valve 143. Then, the load lock chamber 141 is evacuated through the exhaust pipe 145 so that the pressure is reduced.

When the load lock chamber 141 has been evacuated to a pressure equal to the pressure in the processing furnace 202, the bottom end of the processing furnace 202 is opened by the furnace port gate valve 147. At that time, the furnace port gate valve 147 is carried and accommodated into the furnace port gate valve cover 149.

After that, the seal cap 219 is lifted up by the elevator bed 161 of the boat elevator 115, so that the boat 217 supported by the seal cap 219 is carried (loaded) into the processing furnace 202.

After the loading, arbitrary processing is performed on the wafers 200 in the processing furnace 202. Then, after the processing, the boat 217 is extracted by the boat elevator 115. Further, the pressure in the load lock chamber 140 is restored to the atmospheric pressure, and then the gate valve 143 is opened. After that, the wafers 200 and the pod 110 are extracted to the outside of the housing 111 by a procedure approximately reversed to the above-mentioned procedure with omission of the wafer orientation process in the notch orienting machine 135.

As described above, the substrate processing system according to the preferred mode of the present embodiment has a group administration apparatus for generating individual merge tables for the substrate processing apparatuses and merging the information of the merge tables and the data acquisition request formats which are display item information of the operation terminals so as to generate a merge data administration table.

Further, in the substrate processing system according to the present embodiment, the group administration apparatus: by using a data accumulation area for accumulating data of the substrate processing apparatuses and the generated merge table, searches a target part of the data accumulation area on the basis of a retrieval condition and a type acquired from the acquisition request format; has a data retrieval result storing table for storing the retrieved result; on the basis of the retrieval result storing table and the merge data administration table, generates an operation terminal retrieval result storing table used for transmitting data to each of the operation terminals; and transmits the contents to the corresponding operation terminal.

Further, in the substrate processing system according to the present embodiment, the group administration apparatus periodically searches the data accumulation area so as to generate the operation terminal retrieval result storing table, and transmits the contents to the corresponding operation terminal.

Further, the data acquisition request from the operation terminal is generated in correspondence to an operation screen switching operation in the operation terminal.

Further, the substrate processing system according to one mode of the present embodiment comprises: a plurality of substrate processing apparatuses for processing substrates; a plurality of operation terminals each for, when the power is turned ON, generating a data acquisition request format for each of the substrate processing apparatuses; and a group administration apparatus for, from among the data acquisition request formats acquired from the plurality of operation terminals, extracting data acquisition request formats of the same substrate processing apparatus and merging the individual display items retrieved with the same retrieval condition so as to generate a merge table.

Further, the group administration apparatus generates individual merge tables for the substrate processing apparatuses and merges the information of the merge tables and the display item information of the operation terminals so as to generate a merge data administration table.

Further, the substrate processing system according to one mode of the present embodiment comprises: a plurality of substrate processing apparatuses for processing substrates; a plurality of operation terminals for generating data acquisition request formats for individual substrate processing apparatuses at the time of data acquisition request; and a group administration apparatus for, from data acquisition request formats for the same substrate processing apparatus among the data acquisition request formats acquired from the plurality of operation terminals, merging and storing display items of the same retrieval condition into a merge table so as to generate individual merge tables for the substrate processing apparatuses, and merging the information of the merge tables and the display item information of the operation terminal so as to generate a merge data administration table, wherein using the generated merge table, the group administration apparatus searches for a data accumulation area for accumulating data of the target substrate processing apparatus on the basis of the retrieval condition and the type, then stores the retrieved result into a data retrieval result storing table, then on the basis of the retrieval result storing table and the merge data administration table, generates an operation terminal retrieval result storing table used for transmitting data to the individual operation terminals, and then transmits the contents to the corresponding operation terminal.

Further, one mode of the present embodiment is a group administration apparatus in a substrate processing system for administering information of a plurality of substrate processing apparatuses in a unified manner, wherein from data acquisition request formats for the same substrate processing apparatus among the data acquisition request formats acquired from the plurality of operation terminals, the group administration apparatus merges and stores display items of the same retrieval condition into a merge table, then generates individual merge tables for the substrate processing apparatuses, and then merges the information of the merge tables and the display item information of the operation terminals so as to generate a merge data administration table.

Further, in one mode of the present embodiment, a substrate processing method in a substrate processing system can also be provided. That is, the method is a substrate processing method in a substrate processing system comprising substrate processing apparatuses for processing substrates, a group administration apparatus for administering a plurality of the substrate processing apparatuses, and a plurality of operation terminals connected to the group administration apparatus, wherein the method comprises: a step that the operation terminals generate data acquisition request formats for individual substrate processing apparatuses at the time of data acquisition request; a step that from the data acquisition request formats of the same substrate processing apparatus among the data acquisition request formats acquired from the individual operation terminals, the group administration apparatus merges them into each display item of the same retrieval condition and then stores it into a merge table so as to generate the merge tables for individual substrate processing apparatuses; a step of merging the information of the merge tables and the display item information of the operation terminals so as to generate a merge data administration table; a step of, by using the generated merge table, searching for a data accumulation area for accumulating data of the target substrate processing apparatus on the basis of the retrieval condition and the type and storing the retrieved result into a data retrieval result storing table; and a step of, on the basis of the data retrieval result storing table and the merge data administration table, generating a GUI terminal retrieval result storing table to be transferred to each GUI terminal and transmitting the contents to the corresponding operation terminal.

What is claimed is:

1. A substrate processing system, comprising:
a plurality of substrate processing apparatuses for processing substrates;
a group administration apparatus for administering said substrate processing apparatuses;
a plurality of operation terminals each for, when connected to said group administration apparatus, generating a data acquisition request format that sets forth retrieval conditions and types of display items classified in individual tables for said substrate processing apparatuses, and then transmitting it to said group administration apparatus; and
a data accumulation area for accumulating data of said plurality of substrate processing apparatuses, wherein said group administration apparatus, at a time of data acquisition request from said plurality of operation terminals, and on a basis of the data acquisition request format acquired from said plurality of operation terminals, expands the data acquisition request format for said plurality of substrate processing apparatuses for each of the plurality of operation terminals, merges types in each display item to be retrieved with a same retrieval condition which is included in retrieval conditions set forth in the expanded data acquisition request formats, so as to generate a plurality of merge tables respectively corresponding to the plurality of substrate processing apparatuses, and searches the data accumulation area using the generated plurality of merge tables.

2. The substrate processing system according to claim 1, comprising a group administration apparatus for generating individual merge tables for said substrate processing apparatuses and merging the information of the merge tables and the data acquisition request formats which are display item information of said operation terminals so as to generate a merge data administration table.

3. The substrate processing system according to claim 2, wherein said group administration apparatus, includes a data retrieval result storing table for storing the retrieved result, compares the contents of said data retrieval result storing table and said merge data administration table with each other so as to generate an operation terminal retrieval result storing table used for transmitting data to said operation terminal, and transmits the contents to the corresponding operation terminal.

4. The substrate processing system according to claim 3, wherein said group administration apparatus periodically searches said data accumulation area so as to generate said operation terminal retrieval result storing table, and transmits the contents to the corresponding operation terminal.

5. A substrate processing system comprising:
a plurality of substrate processing apparatuses for processing substrates;
a plurality of operation terminals each for, when a power is turned ON, generating a data acquisition request format that sets forth retrieval conditions and types of display items classified in individual tables for said substrate processing apparatuses;
a data accumulation area for accumulating data of said plurality of substrate processing apparatuses; and
a group administration apparatus for, a basis of the data acquisition request formats acquired from said plurality of operation terminals, expanding data acquisition request formats for the plurality of substrate processing apparatuses for each of the plurality of operation terminals, merging types in each display item to be retrieved with a same retrieval condition which is included in retrieval conditions set forth in the expanded data acquisition request format, so as to generate a plurality of merge tables respectively corresponding to the plurality of substrate processing apparatuses, and searching the data accumulation area using the generated plurality of merge tables.

6. The substrate processing system according to claim 5, wherein said group administration apparatus generates individual merge tables for said substrate processing apparatuses and merges the information of the merge tables and the display item information of said operation terminals so as to generate a merge data administration table.

7. A data retrieval method for substrate processing Apparatuses, the method comprising:

transmitting a data acquisition request format in which a retrieval condition and a data type are formatted for each display item to be displayed on an operation terminal of displaying target;
expanding, on a basis of data acquisition request format acquired from the operation terminal, a data acquisition request format for the substrate processing apparatuses:
merging data types in each display item to be retrieved with a same retrieval condition which is included in retrieval conditions set forth in the expanded data acquisition request format, so as to generate a plurality of merge tables respectively corresponding to the substrate processing apparatuses; and
retrieving data of retrieval target by using the plurality of merge tables.

8. The data retrieval method according to claim 7, further comprising:
storing a result of retrieval of the data of retrieval target performed by using said merge table into a first retrieval result storing table; and
comparing said first retrieval result storing table with a merge data administration table generated by merging said data acquisition request format and said merge table so as to generate a second retrieval result storing table used for transmitting the data, and then transmitting the contents of the second retrieval result storing table to said corresponding operation terminal.

9. The data retrieval method according to claim 7, the method further comprising storing the data acquisition request format in an internal table for the operation terminal before said transmitting, wherein the operation terminal comprises a graphical user interface (GUI) terminal.

10. The data retrieval method according to claim 7, the method further comprising storing said merged data types in the merge table.

11. The data retrieval method according to claim 7, the method further comprising generating the data acquisition request format that comprises the retrieval condition and the data type for said each display item, before said transmitting.

12. The data retrieval method according to claim 7, wherein said merging data types is performed before the merge table is generated.

13. The data retrieval method according to claim 7, the method further comprising:
extracting a first retrieval condition of a first display item of a first apparatus from a display item storing table of the operation terminal;
extracting a first type of the first display item of the first apparatus in the display item storing table of the operation terminal;
setting the first type of the first display item of the first apparatus in the display item storing table of the operation terminal as a first type of the first apparatus in the merge table;
comparing a first retrieval condition of a second display item of the first apparatus in the display item storing table with a first retrieval condition of the first apparatus in the merge table,
wherein, if the first retrieval condition of the second display item of the first apparatus in the display item storing table is a same with the first retrieval condition of the first apparatus in the merge table, the first retrieval condition of the second item of the first apparatus in the display item storing table is not added to the merge table.

14. The data retrieval method according to claim 13, wherein if the first retrieval condition of the second display item of the first apparatus in the display item storing table is different from the first retrieval condition of the first apparatus in the merge table, the first retrieval condition of the second item of the first apparatus in the display item storing table is set as a second retrieval condition in the merge table.

15. The data retrieval method according to claim 13, wherein if a type of the first retrieval condition of the second display item of the first apparatus in the display item storing table is different from a type of the first retrieval condition of the first apparatus in the merge table, a subsequent type of the first retrieval condition of the first apparatus in the merge table is compared with the type of the first retrieval condition of the second display item of the first apparatus in the display item storing table.

16. The substrate processing system according to claim 1, wherein the plurality of merge tables comprises a merge data administration table, and a retrieval item data merge table.

17. The data retrieval method according to claim 13, wherein said generating the plurality of merge tables comprises generating a merge data administration table, and generating a retrieval item data merge table.

18. The data retrieval method according to claim 17, wherein the merge data administration table comprises a display item information for the operation terminal, and a merge table information.

* * * * *